(12) United States Patent
Aluru et al.

(10) Patent No.: US 12,182,939 B2
(45) Date of Patent: Dec. 31, 2024

(54) REAL-TIME RENDERING OF IMAGE CONTENT GENERATED USING IMPLICIT RENDERING

(71) Applicant: Soul Vision Creations Private Limited, Bangalore (IN)

(72) Inventors: Sravanth Aluru, Bengaluru (IN); Gaurav Baid, Bengaluru (IN); Shubham Jain, Bengaluru (IN); Shrey Chopra, Bengaluru (IN); Rakesh V, Bengaluru (IN)

(73) Assignee: Soul Vision Creations Private Limited, Bangalore (IN)

( * ) Notice: Subject to any disclaimer, the term of this patent is extended or adjusted under 35 U.S.C. 154(b) by 102 days.

(21) Appl. No.: 17/804,264

(22) Filed: May 26, 2022

(65) Prior Publication Data

US 2023/0410425 A1 Dec. 21, 2023

(51) Int. Cl.
| | | |
|---|---|---|
| *G06T 17/00* | (2006.01) | |
| *G06F 1/03* | (2006.01) | |
| *G06N 3/04* | (2023.01) | |
| *G06T 1/20* | (2006.01) | |
| *G06T 15/00* | (2011.01) | |
| *G06T 17/10* | (2006.01) | |

(52) U.S. Cl.
CPC ............... *G06T 17/10* (2013.01); *G06F 1/03* (2013.01); *G06N 3/04* (2013.01); *G06T 1/20* (2013.01); *G06T 15/005* (2013.01)

(58) Field of Classification Search
CPC ......... G06T 17/10; G06T 1/20; G06T 15/005; G06F 1/03; G06N 3/04

USPC .......................................................... 345/418
See application file for complete search history.

(56) References Cited

U.S. PATENT DOCUMENTS

| | | | |
|---|---|---|---|
| 2013/0011008 A1* | 1/2013 | Ikezoye | G06Q 30/0631 |
| | | | 382/100 |
| 2022/0156993 A1 | 5/2022 | Lee et al. | |
| 2022/0284658 A1* | 9/2022 | Müller | G06N 3/084 |
| 2023/0222623 A1* | 7/2023 | Ke | G06N 3/045 |
| | | | 382/155 |
| 2023/0281913 A1* | 9/2023 | Rematas | G06T 17/10 |
| | | | 345/419 |

(Continued)

FOREIGN PATENT DOCUMENTS

| | | |
|---|---|---|
| CN | 114049434 A | 2/2022 |
| WO | 2022104299 A1 | 5/2022 |

OTHER PUBLICATIONS

International Search Report and Written Opinion of International Application No. PCT/IN2023/050497 dated Sep. 27, 2023, 8 pp.

(Continued)

*Primary Examiner* — Gordon G Liu
(74) *Attorney, Agent, or Firm* — Shumaker & Sieffert, P.A.

(57) ABSTRACT

A device for graphical rendering includes a memory and processing circuitry. The processing circuitry is configured to receive sample values, transmitted by one or more servers, of samples of an object, wherein the sample values are generated by the one or more servers from inputting coordinates into a trained neural network and outputting, from the trained neural network, the sample values of the samples, store the sample values in the memory, and render image content of the object based on the sample values.

18 Claims, 4 Drawing Sheets

(56) References Cited

U.S. PATENT DOCUMENTS

2024/0005590 A1* 1/2024 Martin Brualla ....... G06T 15/04

OTHER PUBLICATIONS

Crassin et al., "GigaVoxels: Ray-Guided Streaming for Efficient and Detailed Voxel Rendering", I3D '09: Symposium on Interactive 3D Graphics and Games, Feb. 27, 2009, 8 pp.
Garbin et al., "FastNeRF: High-Fidelity Neural Rendering at 200FPS", Proceedings of the IEEE/CVF International Conference on Computer Vision (ICCV), Oct. 10, 2021, pp. 14346-14355.
Hedman et al., "Baking Neural Radiance Fields for Real-Time View Synthesis", Proceedings of the IEEE/CVF International Conference on Computer Vision (ICCV), Oct. 10, 2021, pp. 5875-5884.
Mildenhall et al., "NeRF: Representing Scenes as Neural Radiance Fields for View Synthesis", European Conference on Computer Vision, Nov. 3, 2020, 17 pp.
Yu et al., "PlenOctrees for Real-time Rendering of Neural Radiance Fields", Proceedings of the IEEE/CVF International Conference on Computer Vision (ICCV), Oct. 10, 2021, pp. 5752-5761.

* cited by examiner

REAL-TIME RENDERING OF IMAGE CONTENT GENERATED USING IMPLICIT RENDERING

TECHNICAL FIELD

The disclosure relates to graphics rendering.

BACKGROUND

Neural Radiance Field (NeRF) is a machine learning based technique, where a neural network is trained from a sparse set of input views for image content (e.g., a scene). In NeRF, the input to the trained neural network is a position and a direction, and the output of the trained neural network is a color value and density value (e.g., opacity) of the image content for the input position and direction. In this way, processing circuitry may utilize the trained neural network to determine the color values and density values from different positions, and render the image content using the determined color values and density values.

SUMMARY

In general, the disclosure describes example techniques of real-time rendering of image content that is generated using implicit rendering. Implicit rendering may refer to rendering techniques in which the image content is represented as functions and equations. As one example, implicit rendering may include rendering using machine learning based techniques (e.g., with trained neural networks), such as Neural Radiance Field (NeRF) techniques, as one example. In some examples, for implicit rendering, the trained neural networks actually represent the image content of an object. The input to a trained neural network may be coordinates and a direction, and the output from the trained neural network may be color and density (e.g., opacity) values at the coordinates for the given direction.

For real-time rendering of image content generated using implicit rendering, this disclosure describes examples of processing circuitry (e.g., a central processing unit (CPU), a graphics processing unit (GPU), combined circuitry of the CPU and GPU, etc.) receiving pre-generated color and density values that are generated on one or more servers. The term "servers" is used to generically refer to computing devices. The one or more servers utilize the trained neural network, executing on the one or more servers, to generate the color and density values. The processing circuitry may utilize volumetric rendering techniques, as described in more detail, to render the pixels for display based on the color and density values. In this manner, rather than having the processing circuitry of a device with limited processing power, the example techniques offload the computationally expensive process of executing the trained neural network of implicit rendering to one or more servers, while still achieving the high-quality image content generated using implicit rendering techniques.

In one example, the disclosure describes a device for graphical rendering, the device comprising: a memory; and processing circuitry configured to: receive sample values, transmitted by one or more servers, of samples of an object, wherein the sample values are generated by the one or more servers from inputting coordinates into a trained neural network and outputting, from the trained neural network, the sample values of the samples; store the sample values in the memory; and render image content of the object based on the sample values.

In one example, the disclosure describes a method of graphical rendering, the method comprising: receiving sample values, transmitted by one or more servers, of samples of an object, wherein the sample values are generated by the one or more servers from inputting coordinates into a trained neural network and outputting, from the trained neural network, the sample values of the samples; storing the sample values in memory; and rendering image content of the object based on the sample values.

In one example, the disclosure describes a computer-readable storage medium storing instructions thereon that when executed cause one or more processors to: receive sample values, transmitted by one or more servers, of samples of an object, wherein the sample values are generated by the one or more servers from inputting coordinates into a trained neural network and outputting, from the trained neural network, the sample values of the samples; store the sample values in memory; and render image content of the object based on the sample values.

The details of one or more examples are set forth in the accompanying drawings and the description below. Other features, objects, and advantages will be apparent from the description and drawings, and from the claims.

DETAILED DESCRIPTION

Figure 1:
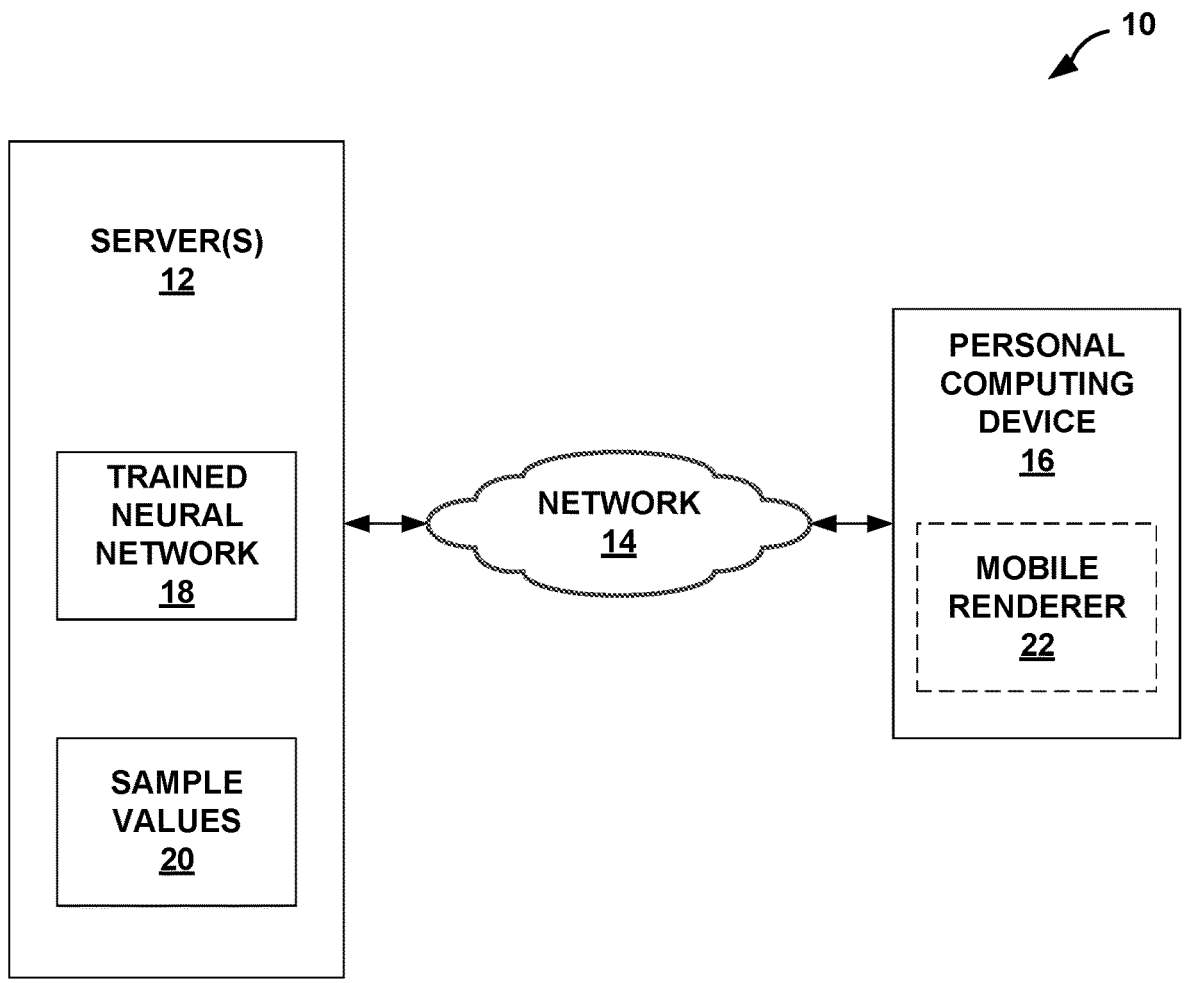
FIG. 1 is a block diagram illustrating a system for real-time rendering of image content of an object generated from implicit rendering.

Content creators for three-dimensional graphical content, such as for extended reality (XR) such as virtual reality (VR), mixed reality (MR), augmented reality (AR), etc. tend to define a three-dimensional object as an interconnection of plurality of polygons. However, generating content in this manner tends to be time, labor, and computationally intensive.

Implicit rendering techniques include a relatively recent manner of creating and rendering three-dimensional graphical content. In implicit rendering, the image content of an object is defined by mathematical functions and equations (e.g., continuous mathematical functions and equations). The continuous mathematical functions and equations are generated from machine learning techniques. For instance, a trained neural network forms the continuous mathematical functions and equations that define the image content of an object. One example technique of implicit rendering is the Neural Radiance Field (NeRF) technique.

For training the neural network, one or more servers may receive a plurality of two-dimensional images, which tend to be easier to define than a three-dimensional object. The one or more servers train the neural network using the plurality of two-dimensional images as the training dataset for training the neural network. The one or more servers also use the plurality of two-dimensional images to confirm the validity of the trained neural network.

To render the image content of the object, in some techniques, the one or more servers transmit the trained neural network (e.g., object code of the trained neural network), and a personal computing device (e.g., mobile device like smart phone or tablet, a laptop, a desktop, video gaming console, AR console, etc.) receives the trained neural network. The personal computing device may execute the trained neural network to render the image content of the object. For instance, the personal computing device may input coordinates, and possibly a direction, into the trained neural network, and the output from the trained neural network may be color and density (e.g., opacity) values at the coordinates for the given direction. The personal computing device may use the color and density values to render the image content of the object. Rendering the image content of the object refers to generating two-dimensional image for display on a screen from the three-dimensional image content of the object.

Implicit rendering techniques tend to produce high-quality image content. However, real-time rendering may be complicated with implicit rendering techniques because executing the trained neural network tends to require relatively high amounts of processing power. Personal computing devices tend to not have such high processing power. Real-time rendering refers to rendering at a rate at which the image content can be displayed in a way that the image content appears smooth as image content is updated. For example, real-time rendering may be rendering at a rate of 30 frames per second or greater.

This disclosure describes example techniques that allow a personal computing device to generate image content that benefits from implicit rendering techniques, while rendering in real-time. For instance, in one or more examples, one or more servers may execute the trained neural network generated for image content of an object. The one or more servers may input coordinates, and possibly direction, into the trained neural network, and generate output of color and density values. The one or more servers may repeat this process for multiple different input coordinates and directions, and generate a data structure that defines the color and density values for different coordinates for the image content of the object.

The one or more servers may transmit the color and density values for the different coordinates that the personal computing device receives. The personal computing device may store the color and density values in memory, and then render the image content of the object based on the color and density values. In this way, rather than the personal computing device executing the trained neural network, the one or more servers having the higher processing power execute the trained neural network. Because the image content is generated using the trained neural network, the rendering performed by the personal computing device may generate image content having the high-quality available from implicit rendering techniques.

Although possible, in one or more examples, the personal computing device may render the image content of the object without needing to repeatedly transmit information to the one or more servers of the viewing direction. For instance, for an extended reality use case, a user may view the image content from different perspectives, and possibly move around the object. In some techniques, the viewing direction and position of the user is repeatedly transmitted to the one or more servers, and the one or more servers transmit image content viewable from the that viewing direction and position.

However, in one or more examples described in this disclosure, the color and density values that the one or more servers transmit are color and density values for the image content when the object is viewed from different directions and positions. That is, rather than generating image content of the object dynamically based on viewing direction and position, in one or more examples, the one or more servers generate the image content of the object from plurality of viewing directions and positions. This way, the image content for the object viewable from different viewing directions and positions is already available on the personal computing device, and the personal computing device can render the image content of the object based on the already available color and density values and viewing directions and positions without needing to wait on image content from the one or more servers.

In one or more examples, to render the image content of the personal computing device may utilize volumetric rendering techniques. In volumetric rendering, processing circuitry (e.g., a central processing unit (CPU), a graphics processing unit (GPU), combined circuitry of the CPU and GPU, etc.) of the personal computing device may determine, with execution of a vertex shader, at least a ray origin and a direction for hypothetical rays in a three-dimensional space that pass through the object. The processing circuitry may access, with execution of a fragment shader, the color and density values along the hypothetical rays in the three-dimensional space based on the ray origin and the direction for hypothetical rays.

As an example, the processing circuitry may store the color and density values in memory as a lookup table. The processing circuitry may also receive and store in memory a hash grid that identifies corresponding locations in the lookup table for respective coordinates. In such examples, the processing circuitry may determine coordinates of points along the ray defined in three-dimensional space, and determine locations into the lookup table that correspond to the coordinates based on the hash grid. The processing circuitry may then access the color and density values stored in the lookup table based on the determined locations. The use of a hash grid and lookup tables is provided as an example, and should not be considered limiting. Other ways in which to store and access color and density values are possible.

The processing circuitry may determine, with the fragment shader, values for pixels in two-dimensional space based on the color and density values along the hypothetical rays in the three-dimensional space (e.g., by accessing the color and density values stored in memory). For instance, the processing circuitry may integrate the color and density values along the ray to determine a value for a pixel in two-dimensional space. The processing circuitry may render the determined values for the pixels. In examples where the personal computing device executes the trained neural network, the processing circuitry may execute the trained neural mode for each point along a ray to determine a value for a pixel in two-dimensional space, which as described above can be time and processing power intensive. With the example techniques described in this disclosure, the processing circuitry may access the color and density values from memory, rather than executing the trained neural network. In this way, the example techniques allow for the personal computing device to render high-quality image content available from implicit rendering, but render the image content in real-time.

To render the image content, the processing circuitry (e.g., with execution of the fragment shader) may be configured to render the image content of the object to a two-dimensional plane geometry that forms as a proxy for object geometry. In one or more examples, there may be benefit in having the plane geometry in front of the user, so that the object appears in the direction in which the user is looking, such as when viewing the image content through a display of the personal computing device. To ensure that the image content appears in the direction in which the user is looking, the processing circuitry may be configured to determine a direction of a perspective camera, where the perspective camera is indicative of a direction in which the user is viewing (e.g., pose and orientation). The processing circuitry may define the two-dimensional plane geometry centered to the direction in which the user is viewing, and may render the image content of the object on the two-dimensional plane geometry.

For a full extended reality experience, such as in virtual reality, the user may desire to view the object from all viewing angles, and perform operations, such as walk around, next to, etc. the object. One issue of defining the two-dimensional plane geometry centered to the direction in which the user is viewing is that without additional processing, as the user moves or tries to view the object from different angles, the object may appear to move along with the user, and not allow the user to view different parts of the object.

Although not necessary in all examples, the processing circuitry may determine that there is a change in a direction in which the user is viewing, and generate information indicative of an amount to rotate the object based on the change in the direction in which the user is viewing. To render the image content, the processing circuitry may be configured to render the image content based on the information indicative of the amount to rotate the object.

For example, there may be a perspective camera that indicates the pose and orientation (e.g., viewing direction) of the user, and an orbit control camera that rotates the object in respect to a user gesture. In one or more example, the processing circuitry may determine a transformation matrix when the perspective camera changes from one frame to another. The processing circuitry may apply an inverse of the transformation matrix to the orbit control camera, which may cause the fragment shader to rotate the object in the opposite direction to give the illusion that the object is stationary. For instance, from the perspective of the user, the object will render in the same location, but will rotate as the viewer is "walking" around the object. In this case, from the perspective of the user, the user will perceive as if he or she is walking around the stationary object, but the processing circuitry is rendering the object at different rotational angles.

FIG. 1 is a block diagram illustrating a system for real-time rendering of image content of an object generated from implicit rendering. As illustrated, system 10 includes one or more servers 12, network 14, and personal computing device 16.

Examples of personal computing device 16 include mobile computing devices (e.g., tablets or smartphones), laptop or desktop computers, e-book readers, digital cameras, video gaming devices, and the like. In some examples, personal computing device 16 may be a headset such as for viewing extended reality content, such as virtual reality, augmented reality, and mixed reality. For example, a user may place personal computing device 16 close to his or her eyes, and as the user moves his or her head, the content that the user is viewing will change to reflect the direction in which the user is viewing the content.

In some examples, servers 12 are within a cloud computing environment, but the example techniques are not so limited. Cloud computing environment represents a cloud infrastructure that supports multiple servers 12 on which applications or operations requested by one or more users run. For example, the cloud computing environment provides cloud computing for using servers 12, hosted on network 14, to store, manage, and process data, rather than at personal computing device 16.

Network 14 may transport data between servers 12 and personal computing device 16. For example, network 14 may form part a packet-based network, such as a local area network, a wide-area network, or a global network such as the Internet. Network 14 may include routers, switches, base stations, or any other equipment that may be useful to facilitate data between personal computing device 16 and servers 12.

Examples of servers 12 include server devices that provide functionality to personal computing device 16. For example, servers 12 may share data or resources for performing computations for personal computing device 16. As one example, servers 12 may be computing servers, but the example techniques are not so limited. Servers 12 may be a combination of computing servers, web servers, database servers, and the like.

Content creators for three-dimensional image content may utilize implicit rendering techniques described above, and the content creators may work in various fields such as commerce, video games, etc. For ease of illustration and example purposes only, one or more examples are described in the space of commerce, but the techniques described in this disclosure should not be considered limited.

For example, a company may generate three-dimensional image content of an object (e.g., a couch) that a user can view from all angles with personal computing device 16. In one or more examples, the company may utilize machine learning (e.g., deep learning) techniques to generate photo-realistic three-dimensional image content. As an example, the company may generate two-dimensional images of the object (e.g., couch) from different viewing angles and different locations of the object (e.g., in front, behind, above, below, etc.). One or more servers 12 may then use the two-dimensional images to generate train a neural network. One example way in which to train the neural network is using the neural radiance field (NeRF) training techniques; however, other techniques are possible. The result of the training is trained neural network 18, as one example. In such machine learning based three-dimensional image content generation, trained neural network 18 is set of continuous mathematical functions and equations that define the object from any viewing angle or position. That is, rather than explicit rendering techniques in which there is a mesh or some other form of physical model that defines the object, in implicit rendering techniques, trained neural network 18 defines the object.

For instance, the way three-dimensional image content is displayed has evolved over time. Three-dimensional content was represented via point clouds, then voxels, meshes etc. Mesh is currently the de-facto representation, finding application in games, three-dimensional movies, AR/VR etc.

As described, three-dimensional content may be represented via implicit functions. The three-dimensional content is assumed to be a function, and one or more servers 12 try to learn this function with the help of various inductive biases. This is similar to learning functions in deep learning.

In one or more examples, one or more server 12 approximate these functions with neural networks to generate trained neural network 18.

For a user to view the object, the user may execute an application on personal computing device 16. For instance, the user may execute mobile renderer 22. Examples of mobile renderer 22 includes a web browser, a gaming application, or an extended reality (e.g., virtual reality, augmented reality, or mixed reality) application. In some examples, mobile renderer 22 may be company specific application (e.g., an application generated by the company to allow the user to view couches made by the company). There may be other examples of mobile renderer 22, and the techniques described in this disclosure are not limited to the above examples.

In some techniques, to view the image content of the object, personal computing device 16 may download trained neural network 18 for local execution. For instance, personal computing device 16 may query trained neural network 18 (e.g., multi-layer perceptron (MLP) neural network) to generate sample values (e.g., at least one of color values and density values) for samples of the object. As an example, inputs to trained neural network 18 may be coordinates and possibly a direction, and output from trained neural network 18 may be sample values of samples of the object. However, querying trained neural network 18 can be time and processing intensive, and therefore, there may be delay when personal computing device 16 can render the image content of the object. In extended reality, as well as other scenarios, such as where the user is viewing the object from different directions, such rendering lag may be undesirable. That is, although utilizing trained neural network 18 may result in high-quality photorealistic image content, the rendering lag may result in user frustration.

This disclosure describes example techniques that allow personal computing device 16 to render image content generated from trained neural network 18 in real-time. That is, rendering rate may be fast enough to achieve the desired rendering rate (e.g., 30 frames per second). For instance, rather than querying trained neural network 18 on personal computing device 16, in one or more examples, personal computing device 16 may be configured to retrieve sample values that are already stored in memory of personal computing device 16.

In one or more examples, one or more servers 12 may be configured to execute trained neural network 18 on one or more servers 12. Because the processing power of one or more servers 12 may be relatively high, one or more servers 12 may be able to execute trained neural network 18 relatively quickly. The result of executing trained neural network 18 may be sample values 20 (e.g., color and/or density values). Sample values 20 may be color and density values for samples of the object from many different viewing perspectives. Sample values 20 may be considered as an implicit representation of the object since sample values 20 are generated from the continuous mathematical function and equations that define the object.

For example, sample values 20 may include color and density values for the object if the user is viewing the object from in front. Sample values 20 may also include color and density values for the object if the user is viewing the object from behind, on each side, from above, from below, and in some examples, for all practical viewing angles. That is, sample values 20 may include color and density values of the object viewed from most any of the 360° of viewing angles.

In one or more examples, in response to executing mobile rendered 22, personal computing device 16 may request for sample values 20. One or more servers 12 may transmit sample values 20 to personal computing device 16. Personal computing device 16 may then utilize sample values 20 to render the image content for the object. Because sample values 20 include color and density values from different directions and locations of the object, as the user moves or interacts with the rendered image content, personal computing device 16 may access the particular color and density values from sample values 20 that correspond to the direction and location at which the user is viewing the object. For instance, although possible, rather than one or more servers 12 repeatedly generating color and density values based on location and direction at which the user is viewing the image content, one or more servers 12 may generate sample values 20 that include color and density values from many different viewing locations and directions, and a full 360° view of the object may be possible from the already generated sample values 20.

Personal computing device 16, in response to execution of mobile renderer 22, may be configured to store sample values 20 in memory. As described in more detail, personal computing device 16 may store sample values 20 as lookup tables. Accordingly, personal computing device 16 may access the color and density values in lookup tables, which may be more computationally efficient than executing trained neural network 18. In some cases, it may be possible for personal computing device to receive and execute trained neural network 18, and the example techniques should not be interpreted to mean that personal computing device 16 never receives trained neural network 18.

As described, one or more servers 12 may transmit sample values 20. In some examples, one or more servers 12 may filter sample values 20 generated from executing trained neural network 18 to a voxel grid, which may be a sparse voxel grid. A voxel grid may be considered as a three-dimensional volume, where points within the volume are voxels. Each voxel may have color and density, and the voxels together may represent the image content that is viewable from any direction.

As also described, sample values 20 may include color and density values. In some examples, in addition to color and density values, sample values 20 may also include normal vectors from the samples on the object (e.g., vectors that extend 90° from the object).

For purposes of rendering the image content of the object by personal computing device 16, not all sample values of samples of the object may needed. In some examples, one or more servers 12 may transmit sample values 20 only for the filled voxels.

As described in more detail below, it may be possible to store sample values 20 as a lookup table of color and density values. In addition to sample values 20, in some examples, one or more servers 20 may generate a hash grid. The hash grid may indicate a location in the lookup table for color and density values of a voxel located at a particular coordinate. For instance, input to the hash grid may be coordinates, and the output from the hash grid may be a location in the lookup table for color and density values for the given coordinates.

To improve quality, one or more servers 12 may perform point cloud-based segmentation to remove cloudy artifacts. As one example, one or more servers 12 may determine an estimate of a point cloud of the object based on a camera position used to generate the image content with trained neural network 18. For instance, the direction may be an input into trained neural network 18, and may be an example of the camera position. One or more servers 12 may clip all density values that are outside the point cloud estimate, and may also perform alpha thresholding for removing noise around the object.

To reduce the amount of information that one or more servers 12 output, one or more servers 12 may perform additional processing. For instance, one or more servers 12 may use decomposition schemes to reduce the percentage of empty voxels, such as by detecting empty regions during post-processing.

Also, in some examples, one or more servers 12 may compress sample values 20 for transmitting. As one example, one or more servers 12 may utilize network based compression, which is a neural network based way in which to compress samples values 20. As another example, one or more servers 12 may utilize video based compression. For instance, one or more servers 12 may encode sample values 20 in accordance with the H.264 or H.265 video coding standards.

Personal computing device 16 receives the compressed information, and decompresses (e.g., decodes) the information to generate sample values 20. Personal computing device 16 may store sample values 20 in memory, along with the hash grid. For instance, the hash grid may be considered as a low-resolution image. The hash grid may not actually be image content, but to leverage the memory usage of personal computing device 16, such as that of a GPU of personal computing device 16, the hash grid may be treated as a low-resolution image. Treating the hash grid as a low-resolution image, or the use of hash grid itself may not be necessary in all examples, and is provided as an example.

Figure 2:
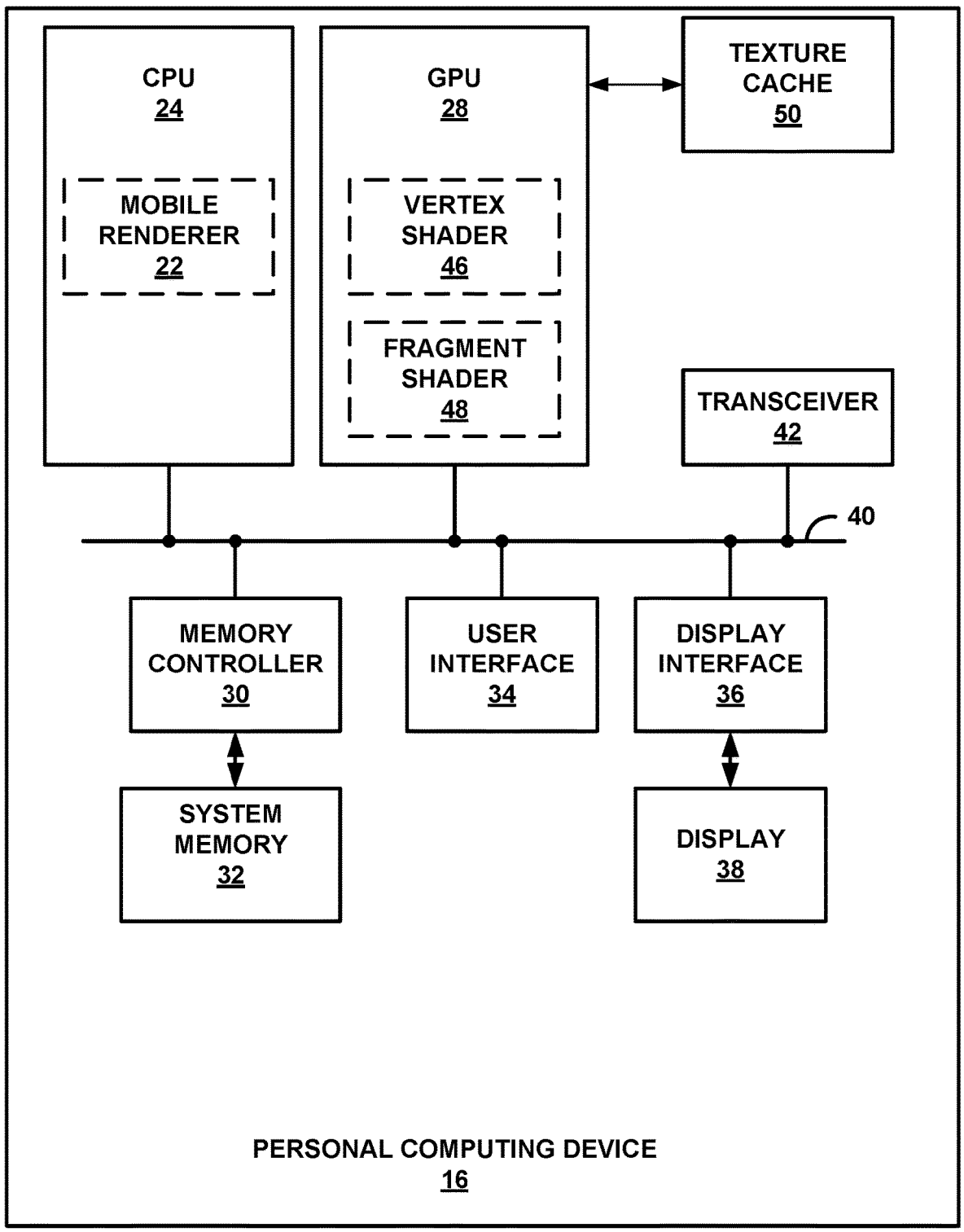
FIG. 2 is a block diagram illustrating an example of a personal computing device configured to perform real-time rendering of image content generated from implicit rendering in accordance with one or more example techniques described in this disclosure.

FIG. 2 is a block diagram illustrating an example of a personal computing device configured to perform real-time rendering of image content generated from implicit rendering in accordance with one or more example techniques described in this disclosure. Examples of personal computing device 16 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA). Additional examples of personal computing device 12 include a personal music player, a video player, a display device, a camera, a television, or any other type of device that processes and/or displays graphical data.

As illustrated in the example of FIG. 2, personal computing device 16 includes a central processing unit (CPU) 24, a graphical processing unit (GPU) 28, memory controller 30 that provides access to system memory 32, user interface 34, and display interface 36 that outputs signals that cause graphical data to be displayed on display 38. Personal computing device 16 also includes transceiver 42, which may include wired or wireless communication links, to communicate with network 14 of FIG. 1.

Also, although the various components are illustrated as separate components, in some examples the components may be combined to form a system on chip (SoC). As an example, CPU 24, GPU 28, and display interface 36 may be formed on a common integrated circuit (IC) chip. In some examples, one or more of CPU 24, GPU 28, and display interface 36 may be in separate IC chips. Various other permutations and combinations are possible, and the techniques should not be considered limited to the example illustrated in FIG. 2. The various components illustrated in FIG. 2 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry.

This disclosure describes example techniques being performed by processing circuitry. Examples of the processing circuitry includes any one or combination of CPU 24, GPU 28, and display interface 36. For explanation, the disclosure describes certain operations being performed by CPU 24, GPU 28, and display interface 36. Such example operations being performed by CPU 24, GPU 28, and/or display interface 36 are described for example purposes only, and should not be considered limiting.

The various units illustrated in FIG. 2 communicate with each other using bus 40. Bus 40 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 2 is merely exemplary, and other configurations of computing devices and/or other image processing systems with the same or different components may be used to implement the techniques of this disclosure.

CPU 24 may be a general-purpose or a special-purpose processor that controls operation of personal computing device 16. A user may provide input to personal computing device 16 to cause CPU 24 to execute one or more software applications. The software applications that execute on CPU 24 may include, for example, mobile renderer 22. However, in other applications, GPU 28 or other processing circuitry may be configured to execute mobile renderer 22. A user may provide input to personal computing device 16 via one or more input devices (not shown) such as a keyboard, a mouse, a microphone, touchscreen, a touch pad or another input device that is coupled to personal computing device 16 via user interface 34. In some examples, such as where personal computing device 16 is a mobile device (e.g., smartphone or tablet), user interface 34 may be part of display 38.

GPU 28 may be configured to implement a graphics pipeline that includes programmable circuitry and fixed-function circuitry. GPU 28 is an example of processing circuitry configured to perform one or more example techniques described in this disclosure. In general, GPU 28 (e.g., which is an example processing circuitry) may be configured to perform one or more example techniques described in this disclosure via fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

GPU 28 may include arithmetic logic units (ALUs), elementary function units (EFUs), digital circuits, analog circuits, and/or programmable cores, formed from programmable circuits. In examples where the operations of GPU 28 are performed using software executed by the programmable circuits, memory 32 may store the object code of the software that GPU 28 receives and executes.

Display 38 may include a monitor, a television, a projection device, a liquid crystal display (LCD), a plasma display panel, a light emitting diode (LED) array, electronic paper, a surface-conduction electron-emitted display (SED), a laser television display, a nanocrystal display or another type of display unit. Display 38 may be integrated within personal computing device 16. For instance, display 38 may be a screen of a mobile telephone handset or a tablet computer. Alternatively, display 38 may be a stand-alone device coupled to personal computing device 16 via a wired or wireless communications link. For instance, display 38 may be a computer monitor or flat panel display connected to a personal computer via a cable or wireless link.

CPU 24 and GPU 28 may store image data, and the like in respective buffers that are allocated within system memory 32. In some examples, GPU 28 may include dedicated memory, such as texture cache 50. Texture cache 50 may be embedded on GPU 28, and may be a high bandwidth low latency memory. Texture cache 50 is one example of memory of GPU 28, and there may be other examples of memory for GPU 28. For example, the memory for GPU 28 may be used to store textures, mesh definitions, framebuffers and constants in graphics mode. The memory for GPU 28 may be split into two main parts: the global linear memory and texture cache 50. Texture cache 50 may be dedicated to the storage of two-dimensional or three-dimensional textures.

A texture in graphics processing may refer to image content that rendered on to an object geometry. As described in more detail, the object geometry on which image content is rendered in one or more examples may be a two-dimensional plane geometry that functions as a proxy object geometry, but the techniques are not limited to a two-dimensional plane geometry. That is, in some techniques, a texture is placed on a three-dimensional mesh that represents the object. The three-dimensional mesh may be considered as an object geometry. In one or more examples described in this disclosure, the texture may be placed on a two-dimensional plane geometry instead of a three-dimensional object geometry.

Texture cache 50 may be spatially close to GPU 28. In some examples, texture cache is accessed through texture samplers that are special dedicated hardware providing very fast linear interpolations.

System memory 32 may also store information. In some examples, due to the limited size of texture cache 50, GPU 28 and/or CPU 26 may determine whether the desired information is stored in texture cache 50 first. If the information is not stored in texture cache 50, CPU 26 and/or GPU 28 may retrieve the information for storage in texture cache 50.

Memory controller 30 facilitates the transfer of data going into and out of system memory 32. For example, memory controller 30 may receive memory read and write commands, and service such commands with respect to memory 32 in order to provide memory services for the components in personal computing device 16. Memory controller 30 is communicatively coupled to system memory 32. Although memory controller 30 is illustrated in the example of personal computing device 16 of FIG. 2 as being a processing circuit that is separate from both CPU 24 and system memory 32, in other examples, some or all of the functionality of memory controller 30 may be implemented on one or both of CPU 24 and system memory 32.

System memory 32 may store program modules and/or instructions and/or data that are accessible by CPU 24 and GPU 28. For example, system memory 32 may store user applications (e.g., object code for mobile renderer 22), rendered image content from GPU 28, etc. System memory 32 may additionally store information for use by and/or generated by other components of personal computing device 16. System memory 32 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 32 may include instructions that cause CPU 24, GPU 28, and display interface 36 to perform the functions ascribed to these components in this disclosure. Accordingly, system memory 32 may be a computer-readable storage medium having instructions stored thereon that, when executed, cause one or more processors (e.g., CPU 24, GPU 28, and display interface 36) to perform various functions.

In some examples, system memory 32 is a non-transitory storage medium. The term "non-transitory" indicates that the storage medium is not embodied in a carrier wave or a propagated signal. However, the term "non-transitory" should not be interpreted to mean that system memory 32 is non-movable or that its contents are static. As one example, system memory 32 may be removed from personal computing device 16, and moved to another device. As another example, memory, substantially similar to system memory 32, may be inserted into personal computing device 16. In certain examples, a non-transitory storage medium may store data that can, over time, change (e.g., in RAM).

Display interface 36 may retrieve the data from system memory 32 and configure display 38 to display the image represented by the generated image data. In some examples, display interface 36 may include a digital-to-analog converter (DAC) that is configured to convert the digital values retrieved from system memory 32 into an analog signal consumable by display 38. In other examples, display interface 36 may pass the digital values directly to display 38 for processing.

As described above, one or more servers 12 may compress and transmit sample values 20 and, in some examples, a hash grid. Transceiver 42 may receive the information, and a decoder (not shown) may reconstruct sample values 20 and the hash grid. In one or more examples, texture cache 50 may store some or all of sample values 20 and the hash grid.

In accordance with one or more examples, CPU 24 and GPU 28 may together utilize sample values 20 to render the image content of the object for display on display 38. For instance, as illustrated and described above, CPU 24 may execute mobile renderer 22, which may be the application for which the image content of the object is being rendered. GPU 28 may be configured to execute vertex shader 46 and fragment shader 48 to actually render the image content of the object. As mobile renderer 22 is executing on CPU 24, mobile renderer 22 may cause CPU 24 to instruct GPU 28 to execute vertex shader 46 and fragment shader 48, as needed. Mobile renderer 22 may generate instructions or data that are fed to vertex shader 46 and fragment shader 48 for rendering. Vertex shader 46 and fragment shader 48 may execute on the programmable circuitry of GPU 28, and other operations of the graphics pipeline may be performed on the fixed-function circuitry of GPU 28.

Vertex shader 46 may be configured to transform data from a world coordinate system of the user given by an operating system or mobile renderer 22 into a special coordinate system known as clip space. For instance, the user may be located at a particular location, and the location of the user may be defined in world coordinate system. However, where the image content is to be rendered so that the image content is rendered at the correct perspective, such as size and location, may be based on clip space.

Vertex shader 46 may be configured to determine a ray origin, a direction, and near and far values for hypothetical rays in a three-dimensional space that is defined by the voxel grid. Fragment shader 48 may access texture cache 50 to determine the color and density values along the hypothetical rays in the three-dimensional space.

For example, to store sample values 20, CPU 24, or possibly GPU 28, may store color and density values in texture cache 50 as a lookup table. Along a hypothetical ray, there may be a plurality of points. Each point may correspond to a particular coordinate. Fragment shader 48 may access, from texture cache 50, a hash grid that identifies corresponding locations in the lookup table for respective coordinates. Fragment shader 48 may determine locations in the lookup table based on the hash grid, and access the color and density values from the lookup table based on the determined locations.

For example, fragment shader 48 may input coordinates for a first point on a ray, and determine the color and density values for the first point. Fragment shader 48 may input the coordinates for the first point into the hash grid, and determine a location in the lookup table of the color and density values stored in texture cache 50. Fragment shader 48 may access the determined location in the lookup table to determine the color and density values for the first point. Fragment shader 48 may input coordinates for a second point on the ray, and determine the color and density values for the second point. Fragment shader 48 may input the coordinates for the second point into the hash grid, and determine a location in the lookup table of the color and density values stored in texture cache 50. Fragment shader 48 may access the determined location in the lookup table to determine the color and density values for the second point. Fragment shader 48 may repeat such operations for points along the ray.

Fragment shader 48 may determine values for pixels in two-dimensional space based on the sample values (e.g., color and density values) along the hypothetical rays in the three-dimensional space. As one example, fragment shader 48 may integrate the color and density values along the ray in the three-dimensional space to determine a value for a pixel in two-dimensional space. There may be other ways in which fragment shader 48 may determine the color and density value for a pixel in two-dimensional space.

Fragment shader 48 may render the determined values for the pixels. In this way, texture cache 50 may store sample values 20 that were generated using implicit rendering techniques, and tend to be fairly photorealistic and use these already stored sample values to render pixels for display on display 38. Rather than requiring personal computing device 16 to execute trained neural network 18, GPU 28 may be able to utilize sample values 20 generated using trained neural network 18 to perform photorealistic rendering because texture cache 50 may already store samples values 20, where sample values 20 were generated using trained neural network 18.

In some examples, mobile renderer 22 may be configured to output the commands to vertex shader 46 and/or fragment shader 48. The commands may conform to a graphics application programming interface (API), such as, e.g., an Open Graphics Library) (OpenGL® API, OpenGL® 3.3, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

As described above, fragment shader 48 may render the determined values for the pixels. For the rendering, mobile renderer 22 may initialize an extended reality session, such as by using one of the rendering APIs described above. As part of initializing the session, mobile renderer 22 may determine a direction in which the user is viewing, which may be information provided by a so-called perspective camera. Initializing the session may also include defining an object geometry on which to render the determined values of the pixels.

In one or more examples, GPU 28 (e.g., with vertex shader 46) may define a two-dimensional plane geometry as the geometry on which fragment shader 48 may render the pixels. The size of the plane may be defined by $grid width X root(3) X voxel size.$. This ensures that entire image content of the object at a given resolution fits within the clip space.

In the definition of $grid width X root(3) X voxel size, the grid width is the resolution of the cache texture grid (e.g., cache texture grid allocated in texture cache 50). Grid width depicts number of voxels along the width of the grid and if the grid width is multiple with voxel size, the result may be the width of the bounding box of the object. To accommodate the object fully, the size of the plane should be such that it is at least the longest diagonal of the box, which is why there is a multiplication with root(3).

Because fragment shader 48 renders the image content of the object to the two-dimensional plane geometry, the plane geometry includes the image content of the object. It may be desirable for the object to be viewable to the user, such that the object is in front of the user. For instance, as the user moves around the object, the user should not see the edges of the two-dimensional plane geometry. Rather, the user should see the object from different angles.

As an example, assume that the plane geometry is stationary and initially in front of the user. Then, assume that the user walks to be perpendicular from his or her original position. In this case, because the plane geometry is stationary, for the user, it would be like the user is looking at the side of a two-dimensional plane.

To avoid such situations, vertex shader 46 may determine a direction in which a user is viewing. Such information may be available from the operating system of CPU 24 or from one or more sensors. Vertex shader 46 may define a two-dimensional plane geometry centered to the direction in which the user is viewing. Fragment shader 48 may be configured to render the image content of the object to the two-dimensional plane geometry. This way, even as the user moves, the two-dimensional plane geometry may also move, since the two-dimensional plane geometry is centered to the direction in which the user is viewing, and the user will view the image content of the object, and not the plane.

Vertex shader 46 may continuously update the location of the two-dimensional plane geometry as the user moves. For example, CPU 24 (e.g., with mobile renderer 22 or some other unit) may pass the user position and orientation information to vertex shader 46, such as may be determined using webXR, which is an open application programming interface (API) that allows rendering three-dimensional content via the Internet across devices. Vertex shader 48 may use two matrices for computing the location of the plane: the view matrix and the perspective matrix. The view matrix transforms the co-ordinates from world space to the view space. The perspective projection matrix maps the world coordinates into clip space coordinates.

Vertex shader 48 may calculate the updated ray origins and directions based on these at every frame, where each frame refers to one instance of rendering the image content. Using the updated ray origins and directions, fragment shader 48 may determine the color and density values along rays, as described above, and determine values for pixels in two-dimensional space (e.g., based on sample values along the hypothetical rays in the three-dimensional space).

In some examples, for extended reality, the object should be placed on the ground. Personal computing device 16 may include gyroscope or some other component that defines where the ground is. Simultaneous localization and mapping (SLAM) techniques available on personal computing device 16 may so define the location of ground. For instance, CPU 24 may execute applications configured to perform the SLAM techniques. In one or more examples, the applications configured to perform the SLAM techniques may output the detected floor coordinates. Vertex shader 46 may define the plane so that the plane extends up from the ground.

As described above, vertex shader 46 may define a two-dimensional plane geometry centered to the direction in which the user is viewing, and therefore, the two-dimensional plane geometry may move with the user. In some cases, while moving the two-dimensional plane geometry with the user may be useful, it may result in being difficult to allow the user to move around the object. This is because fragment shader 48 may keep rendering image content of the object from the same perspective to the plane geometry.

To address this potential issue, in one or more examples, GPU 28 may determine that there is a change in a direction in which a user is viewing. Vertex shader 46 may generate information indicative of an amount to rotate the object based on the change in the direction in which the user is viewing. In such examples, to render the image content, fragment shader 48 may render the image content based on the information indicative of the amount to rotate the object.

For example, as described above, there may be a perspective camera that indicates the pose and orientation (e.g., viewing direction) of the user, and an orbit control camera that rotates the object in respect to a user gesture. In one or more example, vertex shader 46 may determine a transformation matrix when the perspective camera changes from one frame to another. Vertex shader 46 may apply an inverse of the transformation matrix to the orbit control camera, which may cause fragment shader 48 to render the object in a way that rotates the object in the opposite direction to give the illusion that the object is stationary. To apply the inverse of the transformation matrix, vertex shader 46 may perform matrix multiplication, where the camera position (e.g., of the orbit control camera) may be parameterized via the matrices, and may be part of the representations that were used for training trained neural network 18.

From the perspective of the user, the object will render in the same location, but will rotate as the viewer is "walking" around the object. In this case, from the perspective of the user, the user will perceive as if he or she is walking around the stationary object, but fragment shader 48 is rendering the object at different rotational angles.

In some examples, fragment shader 48 may be configured to perform additional operations to further enhance the quality of image content. For example, image content rendered from implicit rendering, such as sample values 20 may have cloudy artifacts around the surface of the object. Fragment shader 48 may be configured to mix sample values 20 around the surface of the object with the scene background to minimize the artifacts.

As another example, as described above, in some examples, one or more servers 12 may also determine normal vectors for samples on the object. In some examples, one or more servers 12 may be configured to extract the normal vectors by modeling the lighting behavior during training of trained neural network 18.

In some examples, one or more servers 12 may adjust for varying exposure while training trained neural network 18 using a differentiable tone mapper. One or more servers 12 learn the rendering settings to apply to images during the final stage. Fragment shader 48 may apply those tone mapper functions before rendering the final color values, so that the objects rendered are not affected by varying illumination in the source environment/capture process.

Figure 3:
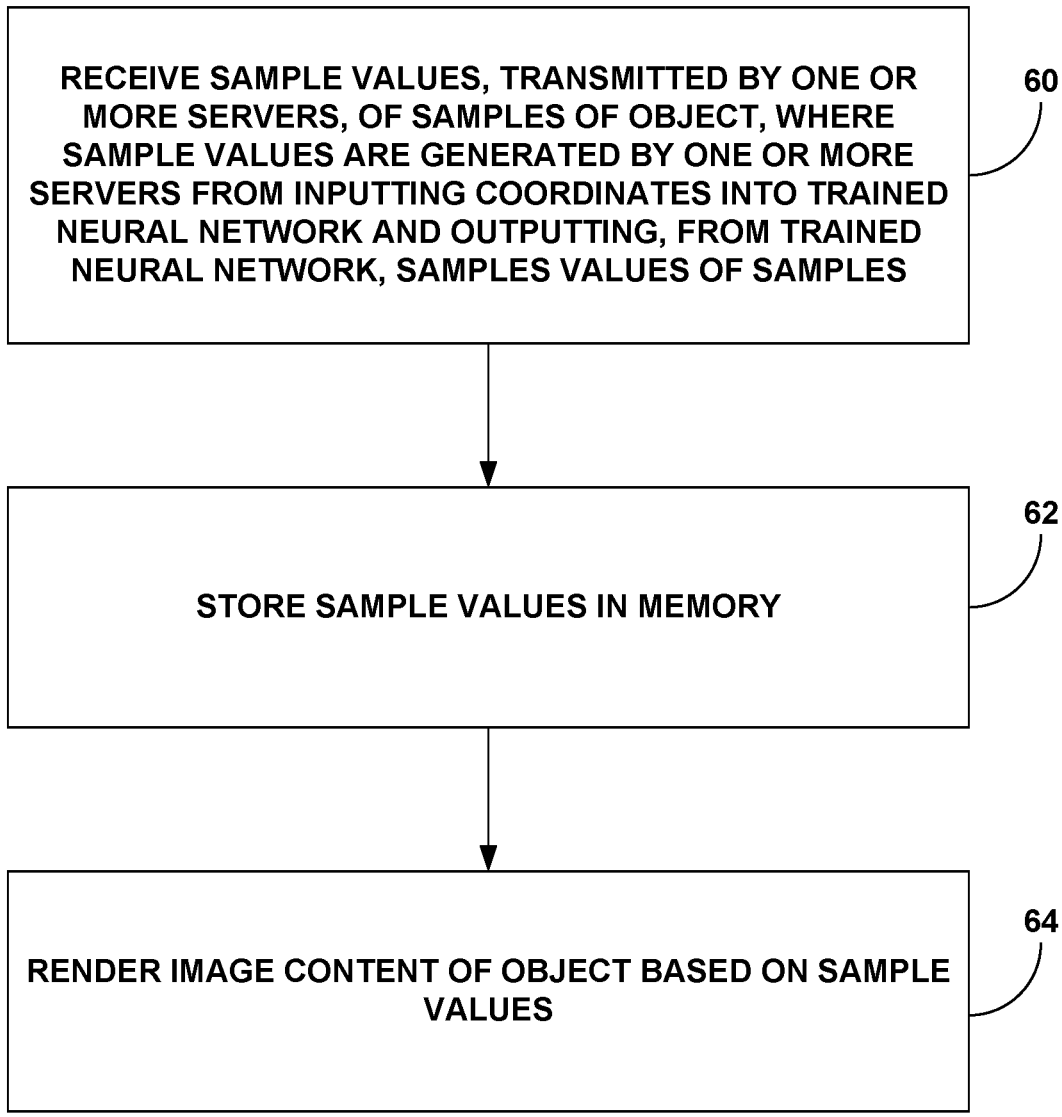
FIG. 3 is a flowchart illustrating an example of real-time rendering of image content generated from implicit rendering.

FIG. 3 is a flowchart illustrating an example of real-time rendering of image content generated from implicit rendering. Processing circuitry (e.g., CPU 24, GPU 28, or a combination) of personal computing device 16 may receive samples values 20, transmitted by one or more servers 12, of samples of an object, where the sample values are generated by one or more servers 12 from inputting coordinates into trained neural network 18 and outputting, from trained neural network 18, sample values 20 of the samples (60). For instance, one or more servers 12 may train trained neural network 18, and generate samples values 20 from different viewing directions and positions so that image content for all around the object is available (e.g., one or more of image content from above, below, from each side, in front, behind, etc. of the object). That is, the sample values 20 of samples of the object include at least one of color and density values of samples of the object from a plurality of viewing directions and positions.

The processing circuitry may store sample values 20 in memory (62). As one example, the memory may be texture cache 50. In some examples, in addition to storing sample values 20 in texture cache 50, the processing circuitry may store a hash grid used to determine location in a lookup table, where sample values 20 are stored in the lookup table.

The processing circuitry may render image content of the object based on samples values 20 (64). There may be various example techniques that the processing circuitry may utilize to render the image content. The processing circuitry may perform one or combination of these example techniques to render the image content.

For instance, to store sample values 20, the processing circuitry may be configured to store color and density values in the memory (e.g., texture cache 50) as a lookup table. The processing circuitry may be configured to access, from the memory (e.g., texture cache 50, system memory 32, or some other memory), a hash grid that identifies corresponding locations in the lookup table for respective coordinates. The processing circuitry may determine locations in the lookup table based on the hash grid, and access the color and density values from the lookup table based on the determined locations. The processing circuitry may render the image content of the object based on the color and density values.

As another example, GPU 28 may determine, with execution of vertex shader 46, at least a ray origin and a direction for hypothetical rays in a three-dimensional space, and access, with execution of fragment shader 48, the sample values of sample values 20 along the hypothetical rays in the three-dimensional space based on the ray origin and the direction for hypothetical rays. GPU 28 may determine, with execution of fragment shader 48, values for pixels in two-dimensional space based on the sample values along the hypothetical rays in the three-dimensional space, and render, with fragment shader 48, the determined values for the pixels.

As additional examples, to render the image content of the object, the processing circuitry may be configured to determine a direction in which a user is viewing, define a two-dimensional plane geometry centered to the direction in which the user is viewing, and render the image content of the object to the two-dimensional plane geometry.

In some examples, the processing circuitry may determine that there is a change in a direction in which a user is viewing, and generate information indicative of an amount to rotate the object based on the change in the direction in which the user is viewing. In such examples, to render the image content, the processing circuitry may be configured to render the image content based on the information indicative of the amount to rotate the object.

Figure 4:
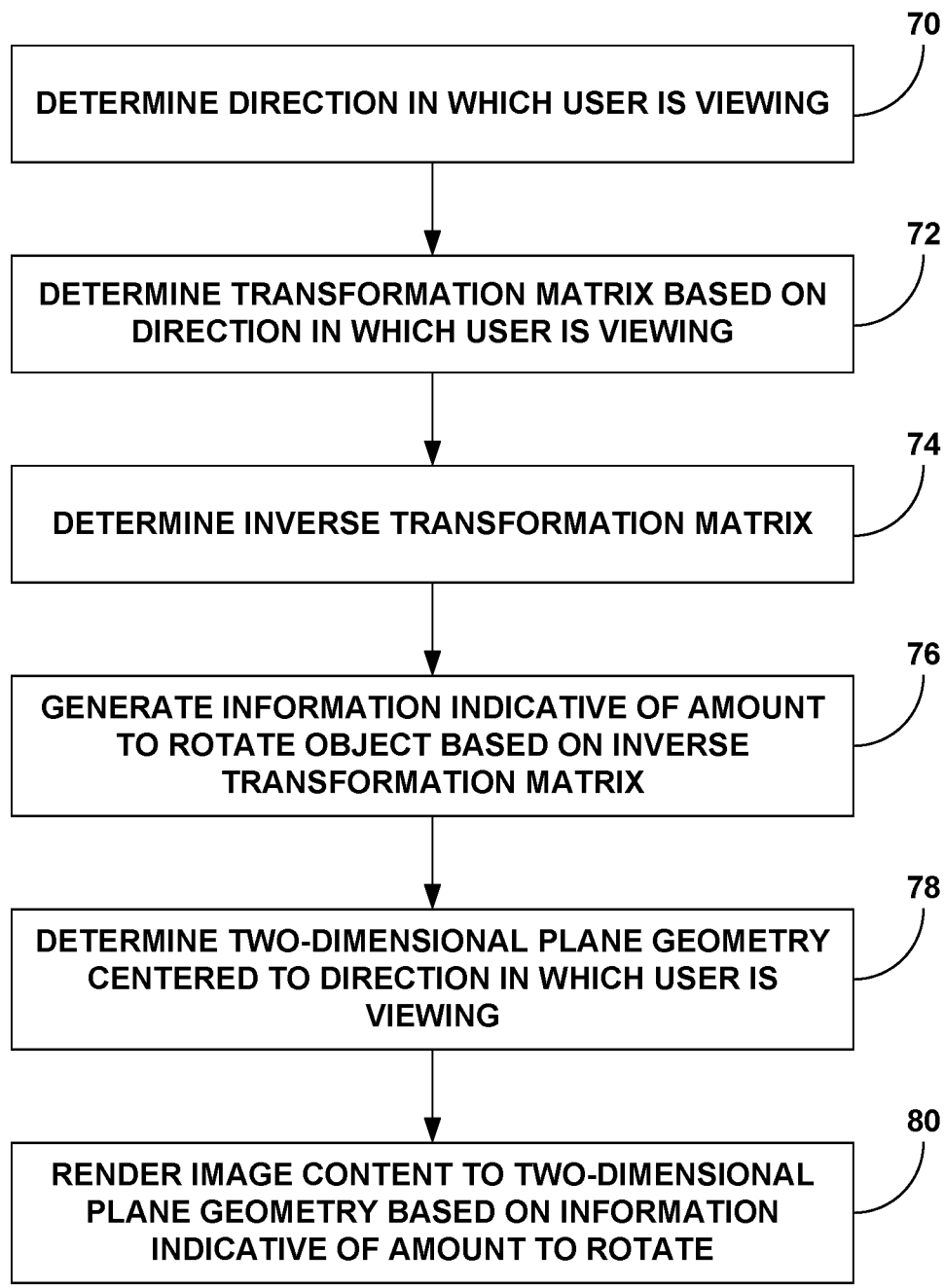
FIG. 4 is a flowchart illustrating another example of real-time rendering of image content generated from implicit rendering.

FIG. 4 is a flowchart illustrating another example of real-time rendering of image content generated from implicit rendering. The flowchart of FIG. 4 provides an example way in which the processing circuitry of personal computing device 16 may render image content of an object that allows the user to walk around or view the object from different positions and locations.

The processing circuitry may determine a direction in which the user is viewing (70). For instance, pose and orientation information may be available from personal computing device 16 that the processing circuitry uses to determine a direction in which the user is viewing.

Vertex shader 46 may determine a transformation matrix based on direction in which the user is viewing (72). Vertex shader 46 may determine an inverse transformation matrix (76). Vertex shader 46 may generate information indicative of amount to rotate object based on the inverse transformation matrix (78). Information indicative of amount to rotate should not be considered limited to examples where a specific value that indicates by how much to rotate is generated. Information indicative of amount to rotate may be the result of applying the inverse transformation matrix to orbit camera control.

Vertex shader 46 may determine two-dimensional plane geometry centered to the direction in which the user is viewing (78). Fragment shader 48 may render image content to the two-dimensional plane geometry based on information indicative of amount to rotate (80).

The following describes example techniques that may be used separately or together.

Example 1. A device for graphical rendering, the device comprising: a memory; and processing circuitry configured to: receive sample values, transmitted by one or more servers, of samples of an object, wherein the sample values are generated by the one or more servers from inputting coordinates into a trained neural network and outputting, from the trained neural network, the sample values of the samples; store the sample values in the memory; and render image content of the object based on the sample values.

Example 2. The device of example 1, wherein to store the sample values, the processing circuitry is configured to store color and density values in the memory as a lookup table, and wherein the processing circuitry is configured to: access, from the memory, a hash grid that identifies corresponding locations in the lookup table for respective coordinates of the samples; determine locations in the lookup table based on the hash grid; and access the color and density values from the lookup table based on the determined locations.

Example 3. The device of any of examples 1 and 2, wherein the processing circuitry is configured to: determine, with execution of a vertex shader, at least a ray origin and a direction for hypothetical rays in a three-dimensional space; and access, with execution of a fragment shader, the sample values along the hypothetical rays in the three-dimensional space based on the ray origin and the direction for hypothetical rays.

Example 4. The device of example 3, wherein to render, the processing circuitry is configured to: determine, with execution of the fragment shader, values for pixels in two-dimensional space based on the sample values along the hypothetical rays in the three-dimensional space; and render, with the fragment shader, the determined values for the pixels.

Example 5. The device of examples 1-4, wherein to render the image content of the object, the processing circuitry is configured to: determine a direction in which a user is viewing; define a two-dimensional plane geometry centered to the direction in which the user is viewing; and render the image content of the object to the two-dimensional plane geometry.

Example 6. The device of examples 1-5, wherein the processing circuitry is configured to: determine that there is a change in a direction in which a user is viewing; and generate information indicative of an amount to rotate the object based on the change in the direction in which the user is viewing, wherein to render the image content, the processing circuitry is configured to render the image content based on the information indicative of the amount to rotate the object.

Example 7. The device of any of examples 1-6, wherein the processing circuitry comprises a graphics processing unit (GPU), and wherein the memory comprises a texture buffer for the GPU.

Example 8. The device of any of examples 1-7, wherein the device comprises at least one of a mobile device, a video gaming device, and a headset.

Example 9. The device of any of examples 1-8, wherein the trained neural network is a neural radiance field (NeRF) trained neural network.

Example 10. The device of any of examples 1-9, wherein the sample values of samples of the object comprise at least one of color and density values of samples of the object from a plurality of viewing directions and positions.

Example 11. A method of graphical rendering, the method comprising: receiving sample values, transmitted by one or more servers, of samples of an object, wherein the sample values are generated by the one or more servers from inputting coordinates into a trained neural network and outputting, from the trained neural network, the sample values of the samples; storing the sample values in memory; and rendering image content of the object based on the sample values.

Example 12. The method of example 11, wherein storing the sample values comprises storing color and density values in the memory as a lookup table, the method further comprising: accessing, from the memory, a hash grid that identifies corresponding locations in the lookup table for respective coordinates of the samples; determining locations in the lookup table based on the hash grid; and accessing the color and density values from the lookup table based on the determined locations.

Example 13. The method of any of examples 11 and 12, further comprising: determining, with execution of a vertex shader, at least a ray origin and a direction for hypothetical rays in a three-dimensional space; and accessing, with execution of a fragment shader, the sample values along the hypothetical rays in the three-dimensional space based on the ray origin and the direction for hypothetical rays.

Example 14. The method of example 13, wherein rendering comprises: determining, with execution of the fragment shader, values for pixels in two-dimensional space based on the sample values along the hypothetical rays in the three-dimensional space; and rendering, with the fragment shader, the determined values for the pixels.

Example 15. The method of any of examples 11-14, wherein rendering the image content of the object comprises: determining a direction in which a user is viewing; defining a two-dimensional plane geometry centered to the direction in which the user is viewing; and rendering the image content of the object to the two-dimensional plane geometry.

Example 16. The method of any of examples 11-15, further comprising: determining that there is a change in a direction in which a user is viewing; and generating information indicative of an amount to rotate the object based on the change in the direction in which the user is viewing, wherein rendering the image content comprises rendering the image content based on the information indicative of the amount to rotate the object.

Example 17. The method of any of examples 11-16, wherein the trained neural network is a neural radiance field (NeRF) trained neural network.

Example 18. The method of any of examples 11-17, wherein the sample values of samples of the object comprise at least one of color and density values of samples of the object from a plurality of viewing directions and positions.

Example 19. A computer-readable storage medium storing instructions thereon that when executed cause one or more processors to: receive sample values, transmitted by one or more servers, of samples of an object, wherein the sample values are generated by the one or more servers from inputting coordinates into a trained neural network and outputting, from the trained neural network, the sample values of the samples; store the sample values in memory; and render image content of the object based on the sample values.

Example 20. The computer-readable storage medium of example 19, further comprising instructions that cause the one or more processors to: determine, with execution of a vertex shader, at least a ray origin and a direction for hypothetical rays in a three-dimensional space; and access, with execution of a fragment shader, the sample values along the hypothetical rays in the three-dimensional space based on the ray origin and the direction for hypothetical rays.

The techniques of this disclosure may be implemented in a wide variety of computing devices. Any of the described units, modules or components may be implemented together or separately as discrete but interoperable logic devices. Depiction of different features as applications or units is intended to highlight different functional aspects and does not necessarily imply that such applications or units must be realized by separate hardware or software components. Rather, functionality associated with one or more applications or units may be performed by separate hardware or software components, or integrated within common or separate hardware or software components.

The techniques described in this disclosure may be implemented, at least in part, in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry. The terms "processor," "processing circuitry," "controller" or "control module" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as random access memory (RAM), read-only memory (ROM), non-volatile random access memory (NVRAM), electrically erasable programmable read-only memory (EEPROM), FLASH memory, magnetic media, optical media, or the like that is tangible. The computer-readable storage media may be referred to as non-transitory. A server, client computing device, or any other computing device may also contain a more portable removable memory type to enable easy data transfer or offline data analysis. The instructions may be executed to support one or more aspects of the functionality described in this disclosure.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the devices, systems, and methods in accordance with the description provided in this disclosure are provided below.

What is claimed is:

1. A device for graphical rendering, the device comprising:
    a memory; and
    processing circuitry configured to:
        receive sample values of samples of an object, wherein the sample values are transmitted by one or more servers external to the device for graphical rendering, wherein the sample values are generated by the one or more servers from inputting multiple different coordinates for different directions into a trained neural network and outputting, from the trained neural network, the sample values of the samples, wherein the sample values of samples of the object form a data structure that defines color and density values of samples of the object, for the multiple different coordinates for the different directions, from a plurality of viewing directions and positions, and wherein the sample values include sample values from a direction different than a direction in which a user is viewing;
        store the sample values in the memory; and
        render image content of the object based on the sample values.

2. The device of claim 1,
wherein to store the sample values, the processing circuitry is configured to store color and density values in the memory as a lookup table, and
wherein the processing circuitry is configured to:
access, from the memory, a hash grid that identifies corresponding locations in the lookup table for respective coordinates of the samples;
determine locations in the lookup table based on the hash grid; and
access the color and density values from the lookup table based on the determined locations.

3. The device of claim 1, wherein the processing circuitry is configured to:
determine, with execution of a vertex shader, at least a ray origin and a direction for hypothetical rays in a three-dimensional space; and
access, with execution of a fragment shader, the sample values along the hypothetical rays in the three-dimensional space based on the ray origin and the direction for hypothetical rays.

4. The device of claim 3, wherein to render, the processing circuitry is configured to:
determine, with execution of the fragment shader, values for pixels in two-dimensional space based on the sample values along the hypothetical rays in the three-dimensional space; and
render, with the fragment shader, the determined values for the pixels.

5. The device of claim 1, wherein to render the image content of the object, the processing circuitry is configured to:
determine the direction in which the user is viewing;
define a two-dimensional plane geometry centered to the direction in which the user is viewing; and
render the image content of the object to the two-dimensional plane geometry.

6. The device of claim 1, wherein the processing circuitry is configured to:
determine that there is a change in the direction in which the user is viewing; and
generate information indicative of an amount to rotate the object based on the change in the direction in which the user is viewing,
wherein to render the image content, the processing circuitry is configured to render the image content based on the information indicative of the amount to rotate the object.

7. The device of claim 1, wherein the processing circuitry comprises a graphics processing unit (GPU), and wherein the memory comprises a texture buffer for the GPU.

8. The device of claim 1, wherein the device comprises at least one of a mobile device, a video gaming device, and a headset.

9. The device of claim 1, wherein the trained neural network is a neural radiance field (NeRF) trained neural network.

10. A method of graphical rendering, the method comprising:
receiving, with processing circuitry of a device for graphical rendering, sample values of samples of an object, wherein the sample values are transmitted by one or more servers external to the device for graphical rendering, wherein the sample values are generated by the one or more servers from inputting multiple different coordinates for different directions into a trained neural network and outputting, from the trained neural network, the sample values of the samples, wherein the sample values of samples of the object form a data structure that defines color and density values of samples of the object, for the multiple different coordinates for the different directions, from a plurality of viewing directions and positions, and wherein the sample values include sample values from a direction different than a direction in which a user is viewing;
storing, with the processing circuitry, the sample values in memory; and
rendering, with the processing circuitry, image content of the object based on the sample values.

11. The method of claim 10,
wherein storing the sample values comprises storing color and density values in the memory as a lookup table,
the method further comprising:
accessing, from the memory, a hash grid that identifies corresponding locations in the lookup table for respective coordinates of the samples;
determining locations in the lookup table based on the hash grid; and
accessing the color and density values from the lookup table based on the determined locations.

12. The method of claim 10, further comprising:
determining, with execution of a vertex shader, at least a ray origin and a direction for hypothetical rays in a three-dimensional space; and
accessing, with execution of a fragment shader, the sample values along the hypothetical rays in the three-dimensional space based on the ray origin and the direction for hypothetical rays.

13. The method of claim 12, wherein rendering comprises:
determining, with execution of the fragment shader, values for pixels in two-dimensional space based on the sample values along the hypothetical rays in the three-dimensional space; and
rendering, with the fragment shader, the determined values for the pixels.

14. The method of claim 10, wherein rendering the image content of the object comprises:
determining the direction in which the user is viewing;
defining a two-dimensional plane geometry centered to the direction in which the user is viewing; and
rendering the image content of the object to the two-dimensional plane geometry.

15. The method of claim 10, further comprising:
determining that there is a change in the direction in which the user is viewing; and
generating information indicative of an amount to rotate the object based on the change in the direction in which the user is viewing,
wherein rendering the image content comprises rendering the image content based on the information indicative of the amount to rotate the object.

16. The method of claim 10, wherein the trained neural network is a neural radiance field (NeRF) trained neural network.

17. A non-transitory computer-readable storage medium storing instructions thereon that when executed cause one or more processors, of a device for graphical rendering, to:
receive sample values of samples of an object, wherein the sample values are transmitted by one or more servers external to the device for graphical rendering, wherein the sample values are generated by the one or more servers from inputting multiple different coordinates for different directions into a trained neural network and outputting, from the trained neural network, the sample values of the samples, wherein the sample values of samples of the object form a data structure that defines color and density values of samples of the object, for the multiple different coordinates for the different directions, from a plurality of viewing directions and positions, and wherein the sample values include sample values from a direction different than a direction in which a user is viewing;

store the sample values in memory; and render image content of the object based on the sample values.

18. The non-transitory computer-readable storage medium of claim 17, further comprising instructions that cause the one or more processors to:

determine, with execution of a vertex shader, at least a ray origin and a direction for hypothetical rays in a three-dimensional space; and access, with execution of a fragment shader, the sample values along the hypothetical rays in the three-dimensional space based on the ray origin and the direction for hypothetical rays.

\* \* \* \* \*